UNITED STATES PATENT OFFICE.

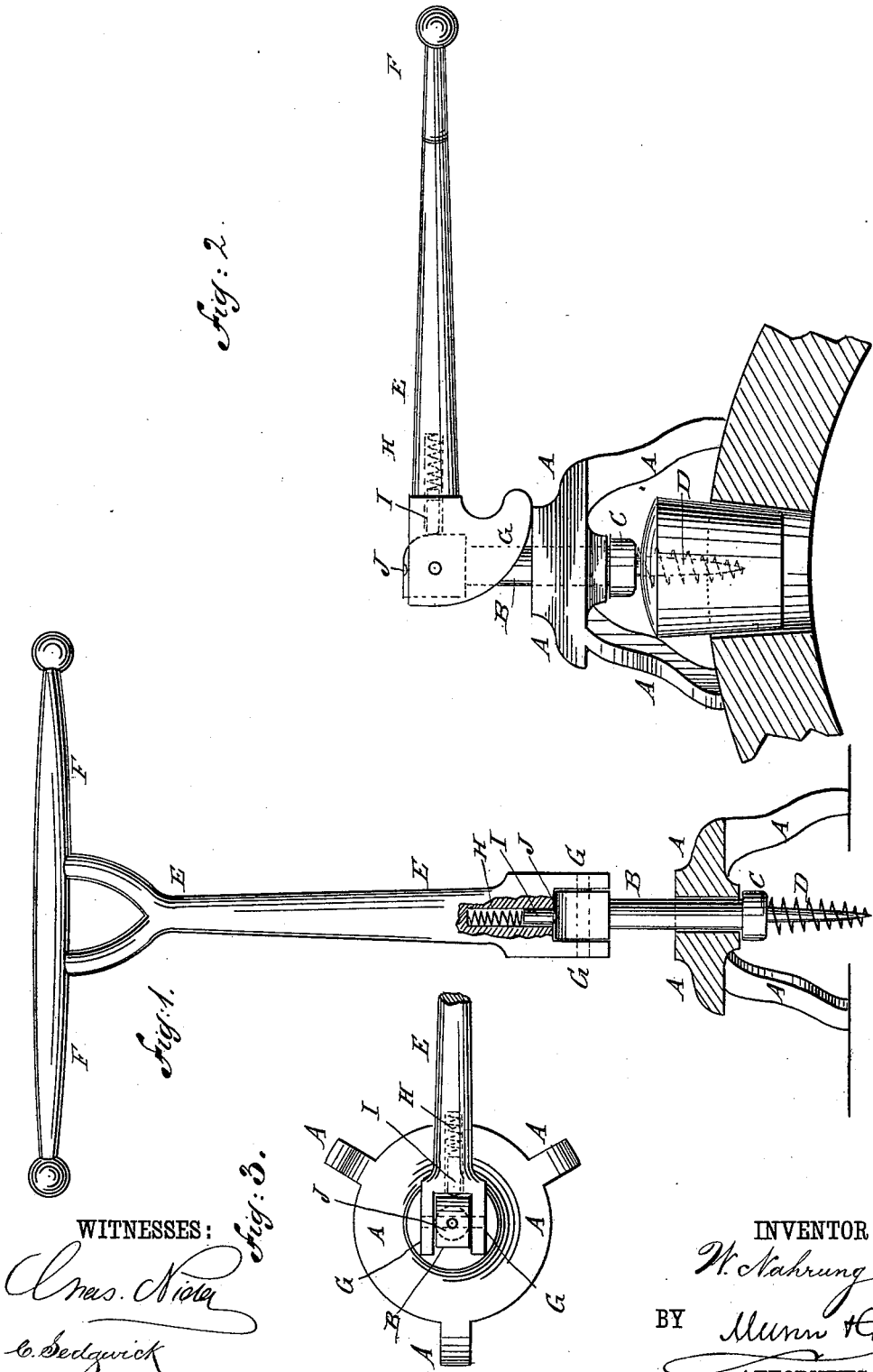

WILLIAM NAHRUNG, OF BROOKLYN, ASSIGNOR TO AUGUST KRONSBERG, OF NEW YORK, N. Y.

BUNG-LIFTER.

SPECIFICATION forming part of Letters Patent No. 336,342, dated February 16, 1886.

Application filed September 2, 1885. Serial No. 175,990. (No model.)

*To all whom it may concern:*

Be it known that I, WILLIAM NAHRUNG, of Brooklyn, in the county of Kings and State of New York, have invented a new and useful Improvement in Bung-Lifters, of which the following is a full, clear, and exact description.

Reference is to be had to the accompanying drawings, forming a part of this specification, in which similar letters of reference indicate corresponding parts in all the figures.

Figure 1 is a side elevation of one of my improved bung-lifters, partly in section and part being broken away, shown in position to be inserted into a bung. Fig. 2 is a side elevation of the same, shown in position when lifting a bung. Fig. 3 is a plan view of the same, part being broken away.

The object of this invention is to provide bung-lifters for removing bungs from casks, constructed in such a manner as to lift the bungs vertically from their seats in the bung-holes, and which shall be simple in construction and convenient in use.

The invention consists in the construction and combination of the various parts of the bung-lifter, as will be hereinafter fully described and then claimed.

A represents the stand of the lifter, which consists of a circular plate provided with three legs and perforated centrally for the passage of the stem B. The middle part of the plate of the stand A is made of sufficient thickness to cause the stem B to move through it in a straight line. The outward movement of the stem B is limited by a collar or shoulder, C, attached to or formed upon it. The forward end of the stem B is reduced, is tapered, and has a sharp-edged screw-thread formed upon it, forming a sharp-pointed tapering screw, D. Upon the upper end of the stem B is formed a head, which fits into and is pivoted to the forked lower end of the shank E of the handle. Upon the outer end of the shank E of the handle is formed a cross-head or other suitably-shaped handle-piece, F. Upon the side of the lower end of the shank E is formed a cam, G which is slotted to receive the stem B and allow the handle to be turned down at right angles with the said stem, as shown in Fig. 2, the face of the cam G bearing upon the upper side of the stand A.

In using the lifter the screw D is screwed into the bung until the legs of the stand A rest upon the staves of the cask. The handle E F is then turned down into a horizontal position, which causes the cam G to act upon the top of the stand A and lift the bung out of its seat in the bung-hole, when the bung and bung-lifter can be taken away together. The shank of the handle is perforated longitudinally from its lower end in the bottom of its slot, and in the said perforation is placed a small spiral spring, H, and a pin, I. The outer end of the pin I is rounded, and is held against the head of the stem B by the spring H.

In the top of the upper end of the stem B is formed an indentation or recess, J, to receive the end of the pin I when the shank E of the handle is in line with the stem B, to prevent the said handle from turning down while screwing the screw D into the bung. The recess J is made shallow, and the corner of the end of the stem B is rounded, so that a lateral pressure upon the handle E F will turn it down and lift the bung from its seat, the end of the pin I sliding over the rounded corner of said stem.

Having thus fully described my invention, I claim as new and desire to secure by Letters Patent—

1. In a bung-lifter, the combination, with the stand A, having central perforation, of the stem B, having screw D, and the pivoted handle E F, having cam G, substantially as herein shown and described, whereby a bung can be readily lifted from its seat in a bung-hole, as set forth.

2. In a bung-lifter, the combination, with the stem B, having screw D and a recess, J, in its upper end, and the handle E F, having perforation in its lower end, of the spiral spring H and the pin I, placed in the said perforation, substantially as herein shown and described, whereby the said stem and handle will be held in line while the screw D is being screwed into the bung, as set forth.

WILLIAM NAHRUNG.

Witnesses:
JAMES T. GRAHAM,
CHAS. SEDGWICK.